(12) United States Patent
Parrish et al.

(10) Patent No.: US 8,071,699 B2
(45) Date of Patent: Dec. 6, 2011

(54) METHODS OF CONTROLLING PROPERTIES IN MULTIMODAL SYSTEMS

(75) Inventors: John R. Parrish, Charleston, WV (US); Mark L. Nelson, Charleston, WV (US)

(73) Assignee: Union Carbide Chemicals & Plastics Technology LLC, Midland, MI (US)

(*) Notice: Subject to any disclaimer, the term of this patent is extended or adjusted under 35 U.S.C. 154(b) by 0 days.

(21) Appl. No.: 12/442,157

(22) PCT Filed: Sep. 21, 2006

(86) PCT No.: PCT/US2006/036849
§ 371 (c)(1),
(2), (4) Date: Jan. 8, 2010

(87) PCT Pub. No.: WO2008/036093
PCT Pub. Date: Mar. 27, 2008

(65) Prior Publication Data
US 2010/0144967 A1 Jun. 10, 2010

(51) Int. Cl.
*C08F 2/00* (2006.01)
*C08F 2/34* (2006.01)

(52) U.S. Cl. .............................. 526/59; 700/269; 702/30
(58) Field of Classification Search .................... 526/59; 700/269; 702/30
See application file for complete search history.

(56) References Cited

U.S. PATENT DOCUMENTS

| | | | | |
|---|---|---|---|---|
| 6,093,211 A | * | 7/2000 | Hamielec et al. | 703/12 |
| 2004/0254309 A1 | * | 12/2004 | Parrish et al. | 526/59 |

OTHER PUBLICATIONS

The International Search Report and Written Opinion, May 23, 2007.

* cited by examiner

*Primary Examiner* — Fred M Teskin

(57) ABSTRACT

The invention is directed to a polymerization system and method of controlling resin properties during the production of bimodal and multimodal polymer compositions using at least one manipulated variable to minimize dynamic deviations from polymer characteristics. In particular embodiments, the method of control includes determining a property of the resin based on a current and/or previous values or estimates or process variables or polymer characteristics. In this manner the control actions serve to reduce process upsets or facilitate in transitioning to a new product or grade to reduce the amount of off-grade resin material produced during transition or during steady state manufacture.

24 Claims, 1 Drawing Sheet

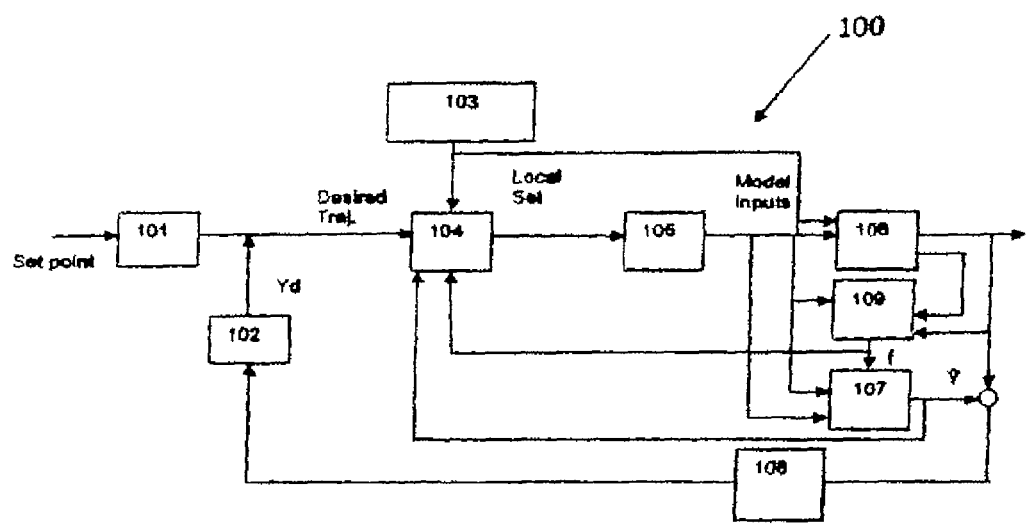

METHODS OF CONTROLLING PROPERTIES IN MULTIMODAL SYSTEMS

PRIOR RELATED APPLICATIONS

This application is a 371 National Stage Application of International Application No. PCT/US06/38649 filed on Sep. 21, 2006 entitled "METHOD OF CONTROLLING PROPERTIES IN MULTIMODAL SYSTEMS," the teachings of which are incorporated by reference herein as if reproduced in full hereinbelow.

FEDERALLY SPONSORED RESEARCH STATEMENT

Not applicable.

REFERENCE TO MICROFICHE APPENDIX

Not applicable.

FIELD OF THE INVENTION

The invention relates generally to polymerization systems and methods of controlling olefin polymerization processes. More particularly, the methods are related to control methods that offset dynamic interactions in systems having two or more components.

BACKGROUND OF THE INVENTION

Changing from one grade of polymer to another requires a transition period for a polymerization reactor to switch over to new resin specifications and corresponding process conditions such as reaction temperature, reactants and reactant ratios. During the transition from one product to another, off-grade polymer material is produced that does not have the desired resin flow property (e.g., melt index), density, or other property of either the initial product or the desired target product. In addition, a polymerization reaction operating under "steady state" conditions can encounter variations that can result in the production of off-grade polymer material that can lead to loss of revenue and reactor shutdown. Since off-grade polymer material presents an economic loss, it is desirable, to minimize the length of time a reactor produces such material and the amount of material that is produced.

A number of methods have been described to reduce transient, off-grade polymer material. Such methods have involved feeding a polymerization retarder or catalyst poison (e.g., $CO_2$, $O_2$) into the reactor, adjusting reaction gas composition, temperature and possibly pressure to new values, removing reactant gases from the reactor, reducing the catalyst feed rate, and/or adding a nonreactive gas such as nitrogen, among other remedial actions.

Despite existing approaches to limit off-grade material, there is a continuing need and desire to provide a more effective and efficient process to reduce the amount of off-grade polymer material produced during the transition to a new product or as a result of a fluctuation during steady state manufacture.

SUMMARY OF THE INVENTION

The invention is directed to a polymerization system and method of controlling resin properties during the production of bimodal and multimodal polymer compositions by manipulating one or several process variables to minimize dynamic deviations from desired polymer characteristics. In particular embodiments, the method of control includes determining a property of the resin based on a current and/or previous values or estimates or process variables or polymer characteristics. In this manner the control actions serve to reduce process upsets or facilitate in transitioning to a new product or grade to reduce the amount of off-grade resin material produced during transition or during steady state manufacture.

Thus, in one aspect embodiments of the invention prove a method of controlling a process for producing a polymer in at least one reactor. Embodiments of the method include (a) calculating a first value of at least one property of a first polymer component using a mathematical model for the first polymer component produced by a first catalyst or under a first set of reaction conditions; (b) calculating a second value of the at least one property of a second polymer component using a mathematical model for the second polymer component produced by a second catalyst or under a first set of reaction conditions (c) determining the relative rate of production of the first and second polymer components; (d) calculating a bulk average value of the at least one property using a mathematical model for the bulk averaged composition; (e) adjusting one or more reaction conditions thereby effecting an instantaneous value of the at least one property of at least one of the first or second polymer components or effecting the production rate of at least one of the first or second polymer components to move the bulk average value toward a desired set point value.

Some embodiments of the method optionally include determining a bias or update factor from estimated or calculated process and resin conditions and an independent laboratory or instrument measurement. In some such embodiments, the first value of the at least one property is an instantaneous value. More particularly some methods also include optionally adjusting the mathematical model for the first polymer component using the update factor determined or derived from the empirical data. In some embodiments, the second value of the at least one property is an instantaneous value. Where the second value of the at least one property is an instantaneous value, some methods include optionally adjusting the mathematical model for the second polymer component using the update factor determined or derived from the empirical data.

Particular embodiments of the method include optionally adjusting the mathematical model for the production rate using the update factor to correlate properties with empirical data. Other embodiments include optionally adjusting the mathematical model for the bulk averaged value of the at least one property using the update factor to correlate the bulk averaged value with empirical data. In other embodiments both the models for the production rate and the bulk averaged value of the at least one property are adjusted. In a particular embodiment, the update factor either adjusts the instantaneous model or the bulk average value by applying the update factor to the mixing rule model.

In another aspect, embodiments of the invention are directed to a method of controlling a process for producing a polymer composition that includes (a) determining an existing volume of a polymer composition; (b) calculating a first instantaneous value of a property and production rate of a first polymer component using a mathematical model at a first time; (c) calculating an second instantaneous value of the property and production rate of a second polymer component using a mathematical model at a first time; (d) calculating a bed average value of the property of polymer composition comprising the first polymer component and the second polymer component from the first and second instantaneous values calculated in (a), (b), and the existing volume based on a set of mixing rules at the first time, $t_1$; and (e) implementing a control action to move the value of the bed average property toward a desired value of the bed average property.

In some embodiments, the control action includes affecting the instantaneous value of the property of the first polymer component and/or affecting the instantaneous value of the property of the second polymer component. Some embodiments include a control action that affects the relative production rates of at least one of the first or second polymer components.

Where the bed average property is determined or estimated, calculating the bed averaged value of the property may be achieved by any suitable method. One such method uses a mixing rule according to the following formula:

$$\hat{P}_{bulk,k}^{-\frac{1}{b}} = \frac{R_{1,k}\hat{P}_{1,k}^{-\frac{1}{b}} + f_k R_{2,k}\hat{P}_{2,k}^{-\frac{1}{b}} + \frac{V_{k-1}}{\Delta t}\hat{P}_{bulk,k-1}^{cor\ -\frac{1}{b}}}{\frac{V_k}{\Delta t} + R_{total,k}}$$

where:
$\hat{P}_{1,k}$=Instantaneous Property of first value at time k
$\hat{P}_{2,k}$=Instantaneous Property of second value at time k
$\hat{P}_{bulk,k-1}^{cor}$=Corrected bulk property at time k−1
$\hat{P}_{bulk,k}$=Bulk property at time k
$R_{1,k}$=Production rate of first value at time k
$R_{2,k}$=Production rate of second value at time k
$R_{total,k}$=Total rate discharged
$f_k$=Model update factor at time k
$V_{k-1}$=Volume of total polymer at time k−1
$V_k$=Volume of total polymer at time k
$\Delta t$=Calculation interval
b=Mixing coefficient The methods described herein may be applied in systems wherein the first and second polymer components are produced by a single catalyst system in a multiple reactor system. In other embodiments, the first and second polymer components are produced by a mixed catalyst system in a single reactor. In still other embodiments, the first component is produced by a first catalyst and the second polymer component is produced by a second catalyst.

BRIEF DESCRIPTION OF THE DRAWINGS

The FIGURE illustrates a process control scheme described herein.

DESCRIPTION OF EMBODIMENTS OF THE INVENTION

In the following description, all numbers disclosed herein are approximate values, regardless whether the word "about" or "approximate" is used in connection therewith. They may vary by 1%, 2%, 5%, and sometimes, 10 to 20%. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1% to 100% with a 1% increment, i.e., k is 1%, 2%, 3%, 4%, 5%, . . . , 50%, 51%, 52%, . . . , 95%, 96%, 97%, 98%, 99%, or 100%. Moreover, any numerical range defined by two R numbers as defined in the above is also specifically disclosed.

The term catalyst as used herein generally refers to a catalytic site where polymerization occurs or to a composition known to effect the polymerization of olefins. In some embodiments a composition having two or more catalytic sites is used. In other embodiments, two or more single-site catalysts are used.

The methods described herein are generally applicable to processes wherein there is a property difference between two components of the overall composition. Suitable properties that are modeled include properties related to molecular weight distribution. In particular embodiments, the first and second properties relate to the melt index or flow index. In other embodiments, to the first and second properties are long or short chain branching frequency or density. In other embodiments, the modeled properties may be hexane extractables. In embodiments, where the invention is applied to polypropylene production processes, suitable properties include xylene solubles, ethylene content, and rubber content.

The methods described herein are generally useful for a variety of reactor system configurations. Some methods may be used in a single reactor system employing a multiple site catalyst. In other embodiments, the methods may be used to control a single reactor with two or more single site catalysts. In still other embodiments, the methods described herein can be applied to multiple reactor systems including serial and parallel reactor designs.

In the following description, a two-reactor system is used to exemplify the particular features of embodiments of the invention. Nevertheless, the skilled artisan readily appreciates that the methods described herein can be applied more generally to multi-reactor systems, systems that make more than two components, and systems using two or more catalysts. The skilled artisan can apply these following concepts also to a single reactor system using dual-site or multi-site catalysts or processes using two or more distinct catalysts or catalyst compositions.

Embodiments of the invention are carried by a controller suitable for multimodal resin control. Embodiments of the control employ an update factor $f_k$ related to the second reactor. This term may be used to correct or update the model based on the resin in the second reactor. In some embodiments, the update factor is determined by empirical measurement using laboratory data and modeled resin properties. In this way, embodiments of the invention provide a control scheme that addresses inherent nonlinearities in the multimodal systems.

An exemplary embodiment of a control strategy 100 is now described with reference to the FIGURE. Adjusting one or more reaction conditions is accomplished using a trajectory generator 101. Typically, set point information is supplied to trajectory generator 101 and the set point trajectory is calculated.

$$af_k = \frac{E_k^{SP}}{\Delta t + E_k^{SP}}$$

where:
$af_k$=Tuning factor for the property at time k
$E_k^{SP}$=Set point tuning time constant for the property at time k
$\Delta t$=Time between iterations
Next, the set point trajectory at time k+1 is calculated.

$$TR_{k+1}^{SP} = af_k(TR_k^{SP}) + (1-af_k)\hat{P}_k^{SP}$$

where:
    $TR_{k+1}^{SP}$=Resin property set point trajectory at time k+1
    $af_k$=Tuning factor for the property at time k
    $TR_k^{SP}$=Resin property set point trajectory at time k
    $\hat{P}_k^{SP}$=Property set point The feedback trajectory outputs 102 are calculated using the following equations.

$$Yd_{k+1}^{FB} = \frac{(\hat{P}_{bulk,k}^{cor} - TR_k^{SP})}{1 + \frac{\Delta t}{E_k^{FB}}}$$

where:
    $Yd_{k+1}^{FB}$=Feedback trajectory at time k+1
    $\hat{P}_{bulk,k}^{cor}$=Modeled property at time k, corrected for any lab samples
    $TR_k^{SP}$=Resin property set point trajectory at time k
    $E_k^{FB}$=Feed back tuning time constant for the property at time k
    $\Delta t$=Time between iterations Other embodiments include one or more of the following features. Some embodiments of the control methodology of the invention include feed forward control using feed forward inputs 103. This control applies a known change to the model bias across a transition at the start of the transition to allow better prediction and control. Some methods include adjusting the amount of error used in correcting the modeled bed average bias based on the expected variation of the lab measurement. Another feature of some embodiments of the invention is constraining the manipulated variable calculated by applying a ramp rate (both up and down) and upper and lower limits. Some embodiments include implementing the tuning constant such that a tuning constant of zero means the controller is shooting for the steady state target value, a positive tuning constant implements an overshoot or more aggressive control, and a negative value implements an undershoot or less aggressive control. In some embodiments, separate tuning is used for transitions and steady state. This separate tuning can be achieved by having a master recipe that is used during steady state operation and a transition recipe that is used during transitions. Another feature that can be included is including time delay factors and data filtering capabilities for the inputs that are used in the control and property prediction. Where desired, the control can be enhanced by using logic based or batch controllers in addition to the continuous control described above. An example of a batch control would be a separate controller that would open a vent if the hydrogen to ethylene ratio would get too high in order to make it fall faster. In particular embodiments, the resulting intermediate control and final control actions are limited by constraints of the system. For example, a sticking temperature constraint that will determine the temperature where resin starts to become sticky resulting in continuity problems or flowability problems of the resin could be calculated and the temperature recommended by the continuous controller would be constrained if it was above this sticking temperature. Other constraints include user defined limits.

With respect to resin properties, calculating the first and second values of the at least one resin property is accomplished through a mathematical model relating catalyst kinetics and other properties to reaction conditions. Typically, in calculating the first and second values, the instantaneous property is calculated using the nonlinear resin property models 104 for each modal component and the conditions present at time k:

$$\hat{P}_{i,k}^I = f(uc, a_j, \alpha_{l,k})$$

where:
    $\hat{P}_{i,k}^I$=Instantaneous resin property i at time k
    $\alpha_{l,k}$=measured process variable l at time k
    $a_j$=Model equation constant j
    uc=Update constant or bias to model based on lab results Calculating the bulk average value of the at least one property is also accomplished through a mathematical model. Preferred models use a mixing rule equation, instantaneous conditions, process conditions, and the bed-average properties at the previous iteration (time k−1). While any suitable mixing rule may be used, particularly useful mixing rules should be stable at boundary conditions and over a wide range of reactor conditions, be time sensitive, and be suitable for use in calculating the control action so the control action is aware of the time dependent nature of the system. In some embodiments, a mixing rule according to the following equation is used:

$$\hat{P}_{bulk,k}^{-\frac{1}{b}} = \frac{R_{1,k}\hat{P}_{1,k}^{-\frac{1}{b}} + f_k R_{2,k}\hat{P}_{2,k}^{-\frac{1}{b}} + \frac{V_{k-1}}{\Delta t}\hat{P}_{bulk,k-1}^{cor\,-\frac{1}{b}}}{\frac{V_k}{\Delta t} + R_{total,k}}$$

where:
    $\hat{P}_{1,k}$=Instantaneous Property of first value (from reactor 1) at time k
    $\hat{P}_{2,k}$=Instantaneous Property of second value (from reactor 2) at time k
    $\hat{P}_{bulk,k-1}^{cor}$=Corrected bulk property (from reactor 2) at bulk k−1
    $\hat{P}_{bulk,k}$=Bulk property (from reactor 2) at time 'k'
    $R_{1,k}$=Production rate of first value (from reactor 1) at time k
    $R_{2,k}$=Production rate of second value (from reactor 2) at time k
    $R_{total,k}$=Total rate discharged
    $f_k$=Model update factor at time k
    $V_{k-1}$=Volume of total polymer at time k−1
    $V_k$=Volume of total polymer at time k
    $\Delta t$=Calculation interval
    b=Mixing coefficient One feature of this mixing rule is that the model update factor $f_k$ is related to the properties and production rate of the second reactor. This is important because determining, either by measuring or modeling, the second reactor product is inherently more difficult. Therefore, it is beneficial to apply the correction at this point.

In control calculations, the results of trajectory generator calculations are used as input to the control calculations 104, where the manipulated variable set points are determined and passed to the basic controller 105. For the case when the modal component production rate is being used to control the resin property the following equation is used:

$$R_{2,k+1}^{SP} = \frac{R_{1,k}\left(\hat{P}_{1,k}^{-\frac{1}{b}} - Yd_{k+1}^{-\frac{1}{b}}\right) + \frac{V_k}{\Delta t}\left(\hat{P}_{bulk,k-1}^{cor\,-\frac{1}{b}} - Yd_{k+1}^{-\frac{1}{b}}\right)}{Yd_{k+1}^{-\frac{1}{b}} - f_k\hat{P}_{2,k}^{-\frac{1}{b}}}$$

where:
    $R_{2,k+1}^{SP}$=Production rate set point of second value (from reactor 2) at time k $R_{1,k}$=Production rate of first value (from reactor 1) at time k $\hat{P}_{1,k}$=Instantaneous Property of first value (from reactor 1) at time k $Yd_{k+1}$=Final trajectory at time k+1

$V_k$=Volume of total polymer at time k $\Delta t$=Calculation interval $\hat{P}_{bulk,k-1}^{cor}$=Corrected bulk property (from reactor 2) at time k−1

$\hat{P}_{2,k}$=Instantaneous Property of second value (from reactor 2) at time k $f_k$=Model update factor for second reactor properties at time k b=Mixing coefficient For the case when a different reactor control variable is being used to control the resin, the target instantaneous property is first calculated.

$$\hat{P}_{2,k+1}^{SP-\frac{1}{b}} = \frac{Yd_{k+1}^{-\frac{1}{b}}\left(\frac{V_k}{\Delta t} + R_{1,k} + R_{2,k}\right) - R_{1,k}\hat{P}_{1,k}^{-\frac{1}{b}} - \frac{V_{k-1}}{\Delta t}\hat{P}_{bulk,k-1}^{cor-\frac{1}{b}}}{f_k R_{2,k}}$$

where:

$\hat{P}_{2,k+1}^{SP}$=Instantaneous property set point of second value (reactor 2) at time k+1

$Yd_{k+1}$=Final trajectory at time k+1

$V_k$=Volume of total polymer (in reactor 2) at time k $V_{k-1}$=Volume of total polymer (in reactor 2) at time k−1

$\Delta t$=Calculation interval $R_{1,k}$=Production rate of first value (from reactor 1) at time k $R_{2,k}$=Production rate of second value (from reactor 2) at time k $\hat{P}_{1,k}$=Instantaneous Property of first value (from reactor 1) at time $f_k$=Model update factor for second reactor properties at time k $\hat{P}_{bulk,k-1}^{cor}$=Corrected bulk property (from reactor 2) at time k−1

After the instantaneous resin property has been calculated, the specific resin property model is inverted to determine the manipulated variable set point. In cases when multiple properties are being controlled the controller decouples conflicting control action.

In particular embodiments of the control methodology, the method determines whether or not the models used to calculate resin properties require any biasing or updating as a result of available lab samples or on line measurements. Optionally, where updating is used then it should be calculated first. This bias or update constant is based on a comparison of the modeled properties calculated as well lab or empirical results obtained from the process 106 of the FIGURE. The data from the process 106 is compared to the modeled or expected resin properties 107. The difference, or a useful derivative thereof, is determined at 108, preferably iteratively, in control scheme 100. An error or difference or fraction of a difference between the process data and the expected value and is used in determining the feedback control trajectory 102. One method of determining a bias or update constant is to calculate a corrected modeled bed average property in the second reactor at the time of the lab sample. The bias or update constant can be calculated according to the equation:

$$\hat{P}_{bulk,ts}^{cor} = \hat{P}_{bulk,ts} + \Delta E$$

where:

$\hat{P}_{bulk,ts}$=The modeled bulk property at sample time ts $\Delta E$=amount of error to be used in updating model.

$\hat{P}_{bulk,ts}^{cor}$=Corrected bulk property at sample time ts

In the simplest case the amount of error is the difference between the model and lab. In a different embodiment the error can be a fraction of the difference between the model and the lab In the case where production rate for one of the modal components will be used to control a resin property, an estimator 109 can be used to the calculate the $f_k$ term.

Information measured from the process 10 in the FIGURE is also used in the calculation. The $f_k$ term is calculated using the following equation.

$$\Delta f_{ts} = \frac{\left[(\hat{P}_{bulk,ts}^{cor})^{-\frac{1}{b}} - (\hat{P}_{bulk,ts})^{-\frac{1}{b}}\right](R_{1,ts} + R_{2,ts})}{R_{2,ts}\hat{P}_{2,ts}^{-\frac{1}{b}}}$$

where:

$\Delta f_{ts}$=The change in the model update factor for second reactor property at the time of the sample ts $\hat{P}_{bulk,ts}^{cor}$=Corrected bulk property at sample time ts $\hat{P}_{bulk,ts}$=Bulk property at sample time ts $\hat{P}_{2,ts}$=Instantaneous property of second value (from reactor 2) at time ts $R_{1,ts}$=Production rate of first value (from reactor 1) at sample time ts $R_{2,ts}$=Production rate of second value (from reactor 2) at sample time ts In the case where other process conditions will be manipulated to control reactor properties an estimator can also be implemented using the following methodology. In these cases the update constant term in modal component instantaneous property term is updated. In order to calculate the new update constant the following series of equations is used.

$$\hat{P}_{2,ts}^{cor} = \left(\frac{\left[(\hat{P}_{bulk,ts}^{cor})^{-\frac{1}{b}} - (\hat{P}_{bulk,ts})^{-\frac{1}{b}}\right](R_{1,ts} + R_{2,ts})}{R_{2,ts}f_{ts}} + \hat{P}_{2,ts}^{-\frac{1}{b}}\right)^{-b}$$

$$UC_{ts}^{cor} = g(\hat{P}_{bulk,ts}^{cor}) - h(T_{ts}, P_{ts}, \text{ratio}\cdot_{ts} ..)$$

where:

$\hat{P}_{2,ts}^{cor}$=Corrected instantaneous property of second value (from reactor 2) at time ts $\hat{P}_{bulk,ts}^{cor}$=Corrected bulk property at sample time ts $\hat{P}_{bulk,ts}$=Bulk property at sample time ts $R_{1,ts}$=Production rate of first value (from reactor 1) at sample time ts $R_{2,ts}$=Production rate of second value (from reactor 2) at sample time ts $f_{ts}$=Model update factor for second reactor properties at sample time ts $\hat{P}_{2,ts}$=Instantaneous property of second value (from reactor 2) before being corrected by lab value at time ts $UC_{ts}^{cor}$=Update constant for reactor 2 property after corrected by lab value at sample time ts g( )=function of property in instantaneous model (i.e. logarithmic for MI, linear for xylene solubles) applied to corrected instantaneous property.

h( )=Unbiased non linear model relating reactor conditions to resin property at sample time ts Sometime, the controller includes two separate trajectory generators. One trajectory generator sets a trajectory for the property set point. The second trajectory generator generates a feedback trajectory for the difference between the model and the set point. This allows the system to control how aggressively it will respond with respect to a set point change independently from how aggressively it will respond to an update from empirical data.

In particular embodiments, the control methodology includes determining a model bias at the start of a transition. Some such methods include not changing the model bias at the start of a transition. Other embodiments use a historical model bias as saved in the recipe. In still other embodiments, the method calculates a model bias based on expected conditions or a relative change to the model bias is applied.

Accordingly, embodiments of the methods described herein provide modeling of polymer reactions in reactor networks and determining one or more control actions. Particular embodiments track instantaneous property measures throughout the reactor network and calculate cumulative property distributions resulting from the mixing of the various reaction components within the reactor system.

It should be understood that the foregoing methods are executed in a digital processor of a computer system. Typically, suitable computer systems a digital processor with sufficient working memory, disk memory and the like, and I/O peripherals common in the art including, but not limited to, a viewing monitor, a keyboard and a mouse. The digital processor may be a node or server in a network of computers Preferably, the methods described herein are executed in the working memory of the digital processor with user input being received from I/O peripherals and visual output being provided on monitor. Typically, a database of reactor system information/data is also involved. The database may reside locally in memory or off disk or the like. The various software modules may share the database information for respective processing. In the preferred embodiment, the control methods described herein form part of a multiplicity of software modules that separately or cooperatively model, monitor and analyze reactor systems, including reactor networks and chemical processes/reactions performed in such reactor networks. Such computer configurations and software modules and architectures are within the purview of the skilled artisan.

Methods described herein can be tailored to a variety of reactor schemes and reaction types. In some embodiments, the control methods described herein are applied in a reactor system for a continuous gas phase polymerization reaction in a stirred or fluidized bed reactor, or for a solution polymerization process. The reactor system includes mechanisms for altering the reaction temperature and the inflow of gases into the reactor, among other control mechanisms. In some embodiments, a low molecular weight component and a high molecular weight component are made in the same reaction vessel. Some such embodiments employ a single catalyst that makes both the low molecular weight component and the high molecular weight component. In other such embodiments, each component is made by a different catalyst in the same reactor. In yet other embodiments, the polymer can be made by combining components from separate reactors. For example, in a parallel reactor process, one reactor can prepare a low molecular weight component while a second reactor can prepare a high molecular weight component and the desired composition is made by combining the low molecular weight component and the high molecular weight component in a third reaction vessel.

The polymerization may be carried out as a batch or a continuous polymerization process. A continuous process is preferred, in which event catalysts, solvent or diluent (if employed), and comonomers (or monomer) are continuously supplied to the reaction zone and polymer product continuously removed therefrom. The polymerization conditions for manufacturing the interpolymers according to embodiments of the invention are generally those useful in the solution polymerization process, although the application is not limited thereto. Gas phase and slurry polymerization processes are also believed to be useful, provided the proper catalysts and polymerization conditions are employed.

In some embodiments, the polymerization is conducted in a continuous solution polymerization system comprising two reactors connected in series or parallel. One or both reactors contain at least two catalysts which have a substantially similar comonomer incorporation capability but different molecular weight capability. The final product is a mixture of the two reactor effluents which are combined prior to devolatilization to result in a uniform mixing of the two polymer products. Such a dual reactor/dual catalyst process allows for the preparation of products with tailored properties. In one embodiment, the reactors are connected in series, that is the effluent from the first reactor is charged to the second reactor and fresh monomer, solvent and hydrogen is added to the second reactor. In one embodiment, the second reactor in a series polymerization process contains a heterogeneous Ziegler-Natta catalyst or chrome catalyst known in the art.

In particular embodiments, the methods are used to control a fluidized bed process. A fluidized bed process is typically practiced by passing a gaseous stream containing one or more monomers continuously through a fluidized bed reactor under reactive conditions in the presence of a polymerization catalyst. The parts of a fluidized bed reaction system typically include a vessel, a bed, a gas distribution plate, inlet and outlet piping, one or more compressors, one or more cycle gas coolers (heat exchangers), and a product discharge system. Typical fluidized bed reactors and procedures are described, for example, in U.S. Pat. No. 6,384,157 (Cai et al.), U.S. Pat. No. 6,063,877 (Kocian et al.), U.S. Pat. No. 5,990,250 (Parrish et al., control of bed temperature), U.S. Pat. No. 5,844,054 (Samples et al.), U.S. Pat. No. 5,627,242 (Jacobson et al.), U.S. Pat. No. 4,482,687 (Noshay et al.), and U.S. Pat. No. 4,302,565 (Goeke et al.), the disclosures of which are incorporated by reference herein.

In a fluidized bed process, the product composition of α-olefin polymers can be varied by changing the molar ratios of monomers introduced into the fluidized bed. The resin product is continuously discharged in granular or particulate form from the reactor as the bed level builds up with polymerization. A gaseous stream of unreacted monomer is withdrawn from the reactor continuously and recycled into the reactor along with make-up monomer added to the recycle stream, and if desired, modifiers and/or an inert carrier gas. During the course of polymerization, the bed is comprised of formed polymer particles, growing polymer particles, and catalyst particles fluidized by polymerization and modifying gaseous components introduced at a flow rate or velocity sufficient to cause the particles to separate and act as a fluid. The production rate can be controlled in part by adjusting the catalyst feed rate. The hydrogen/monomer molar ratio or other reactant concentrations (e.g., comonomer feed, chain termination agent feed such as hydrogen or a poison such as oxygen) can be adjusted to control average molecular weights.

The residence time of the mixture of reactants including gaseous and liquid reactants, catalyst, and resin in the fluidized bed is generally about 1 to about 12 hours, and the total pressure in the fluidized bed reactor is generally about 100 to about 600 psi (pounds per square inch). Partial pressure of the primary α-olefin is set according to the amount of polymer desired. The balance of the total pressure is provided by α-olefins other than the primary α-olefin and/or inert gases such as nitrogen and inert hydrocarbons. The temperature in the reactors is generally in the range of about 10° C. to about 130° C.

A stirred-tank reaction is typically practiced using a two-phase (gas/solid) stirred bed, back mixed reactor. A typical stirred tank reactor is described, for example, in U.S. Pat. No. 5,844,054. (Samples et al.), the disclosure of which is incorporated by reference herein. In general, a set of four "plows" mounted horizontally on a central shaft in a vertical cylindrical chamber rotate to keep the particles in the reactor mechanically fluidized. A disengager vessel is mounted atop the vertical cylinder on the reactor. Gas is continually recirculated through both the reactor and disengager via a blower so that the gas composition is homogeneous throughout. Reactor pressure used is typically in the range of about 300 to about 450 psig. Partial pressures of monomers and hydrogen (for molecular weight control) are typically about 150 to about 300 psig. Gas composition can be measured at time intervals by a gas chromatograph analyzer. The reactor is typically cooled by an external jacket of chilled glycol to maintain a reactor temperature of about 10° C. to about 110° C. Catalyst precursor can be fed either dry or as a slurry. The reactor is typically run in a continuous mode in which granular polymer is withdrawn while the polymerization is in progress.

A typical run in either a fluidized bed reactor or a stirred tank reactor commences with monomers being charged to the reactor and feeds adjusted until the desired gas composition is reached. An initial charge of cocatalyst is added prior to starting catalyst feeding in order to scavenge any poisons present in the reactor. After the catalyst feed starts, monomers are added to the reactor sufficient to maintain gas concentrations and ratios. Cocatalyst feed rate is maintained in proportion to the catalyst feed rate. A start-up bed can be used to facilitate stirring and dispersal of catalyst during the initial part of the operation. After the desired batch weight is made, the reactor is vented, and monomers are purged from the resin with nitrogen. The batch is then discharged into a box, open to the atmosphere, unless other catalyst deactivation measures are specified.

A conventional system for conducting a solution polymerization process comprises a single loop reactor or dual loop reactor. Flow loop recycling reactors are described, for example, in U.S. Pat. No. 5,977,251 and WO97/36942 (Kao et al., to The Dow Chemical Company), the disclosures of which are incorporated by reference herein. A flow loop reactor includes a monomer inlet, catalyst inlet, solvent inlet, and a product outlet, and other features including, for example, an additive inlet, a static mixer, recycling line, and purification beds. A pump moves the reactant materials and polymer around the flow loop.

In such a system, monomer/comonomer and a chain termination agent can be flowed into a solvent delivered through the solvent inlet, and then introduced into the flow loop reactor at a monomer inlet. Catalyst and cocatalyst are combined to form a catalyst solution, a mixture with solid activated catalyst suspended therein, or a slurry of support particles with adsorbed catalyst suspended in a solvent media, which is injected or flowed through the catalyst inlet into the flow loop. Polymer is flowed out of the reactor through the polymer outlet. In a continuous system, some of the material in the reaction stream flows continuously past the product outlet and back through the loop.

The polymer produced can be a polyolefin, e.g., homopolymer or copolymer of ethylenically and/or acetylenically unsaturated monomers. Such monomers include C2-C20 α-olefin monomers including, but are not limited to, ethylene, propylene, isobutylene, 1-butene, 1-pentene, 1-hexene, 4-methyl-1-pentene, 1-decene, 1-octene, 1-nonene, 1-undocene, 1-dodecene, 1-tridecene, 1-tetradecene, 1-pentadecene, among others. Other monomers include styrene, $C_1$-$C_4$ alkyl substituted styrenes, tetrafluoroethylene, vinylbenzocyclobutene, dienes such as 1,4-hexadiene, dicyclopentadiene, ethylidenenorbornene, 1,7-octadiene and 1,9-decadiene, and cycloalkenes such as cyclopentene, cyclohexene and cyclooctene.

The various olefin polymerization reactors can be utilized and adjusted to produce a wide variety of polymer products. Exemplary polymers that can be produced in accordance with the invention include homopolymers and copolymers of polyethylene, polypropylene, and $C_3$-$C_{12}$ α-olefins; terpolymers of ethylene, at least one $C_3$-$C_{12}$ α.-olefin and a diene such as ethylene-propylene-diene monomer (EPDM); polybutadiene, polyisoprene, polystyrene; and other rubbers. Generally, the polymer products made by a given reactor system use the same reactants but in different ratios and at different temperatures. Each of these polymer products can be made with a number of different resin properties, or grades. Each grade of polymer product has a narrow limit on its properties, e.g., density and melt index.

The reactors can be utilized to prepare various polymer types including, but not limited to, homogeneous polymers, heterogeneous polymers, substantially linear polymers, substantially random ethylene/styrene interpolymers, and olefin-based elastomers.

Homogeneous linear ethylene polymers can be prepared in conventional polymerization processes using Ziegler-type catalysts such as, for example, zirconium and vanadium catalyst systems, as exemplified in U.S. Pat. No. 3,645,992 to Elston, incorporated herein by reference. U.S. Pat. No. 4,937,299 to Ewen et al. and U.S. Pat. No. 5,218,071 to Tsutsui et al., each of which is incorporated herein by reference, disclose the use of metallocene catalysts, such as catalyst systems based on zirconium and hafnium, for the preparation of homogeneous linear ethylene polymers. Homogeneous linear ethylene polymers are typically characterized as having a molecular weight distribution, Mw/Mn, of about 2. Commercially available examples of homogeneous linear ethylene polymers include those sold by Mitsui Petrochemical Industries as Tafmer™ resins and by Exxon Chemical Company as Exact™ resins.

Heterogeneous linear ethylene polymers are available from The Dow Chemical Company as Dowlex™ LLDPE and as Attane™ ULDPE resins. Heterogeneous ethylene polymers are typically characterized as having molecular weight distributions, Mw/Mn, in the range of from 3.5 to 4.1. Heterogeneously branched ethylene polymers are characterized as a mixture of interpolymer molecules having various ethylene to comonomer molar ratios, and a short chain branching distribution index (SCBDI) less than about 30 percent. Heterogeneous polymers also have multiple melting peaks (i.e., exhibit at least two distinct melting peaks). All known heterogeneously branched ethylene polymers are linear and have no measurable or demonstrable long chain branching. Heterogeneous linear ethylene polymers can be prepared via the solution, slurry or gas phase polymerization of ethylene and one or more optional α-olefin comonomers in the presence of a Ziegler-Natta catalyst, by processes such as are disclosed in U.S. Pat. No. 4,076,698 (Anderson et al.) and U.S. Pat. No. 5,231,151 (Spencer et al.), incorporated herein by reference.

Ziegler-Natta type polymerization processes are also described, for example, in U.S. Pat. No. 4,314,912 (Lowery, Jr. et al.), U.S. Pat. No. 4,612,300 (Coleman, III), U.S. Pat. No. 5,869,575 and U.S. Pat. No. 5,844,045 (Kolthammer et al.) and U.S. Pat. No. 5,231,151 (Spencer et al.) (all to The Dow Chemical Company), the disclosures of which are incorporated by reference herein.

Substantially linear ethylene polymers (SLEPs) are homogeneously polymers having long chain branching, and are described, for example, in U.S. Pat. Nos. 5,272,236, 5,278,272, 5,665,800 and 5,783,638 (Lai et al., to Dow Chemical), the disclosures of which are incorporated by reference herein. The term "substantially linear" means that, in addition to the short chain branches attributable to homogeneous comonomer incorporation, the ethylene polymer has long chain branches, such that the polymer backbone is substituted with an average of 0.01 to 3 long chain branches/1000 carbons. The melt index for SLEPs is generally at least about 0.1 grams/10 minutes (g/10 min) up to about 100 g/10 min. SLEPs are made by the Insite™ Process and Catalyst Technology, and are available from The Dow Chemical Company as Affinity™ polyolefin plastomers and from DuPont Dow Elastomers, LLC as Engage™ polyolefin elastomers. SLEPs can be prepared via the solution, slurry, or gas phase, preferably solution phase, polymerization of ethylene and one or more optional α-olefin comonomers by a continuous process in the presence of a constrained geometry catalyst, such as is disclosed, for example, in European Patent Application No. 416,815-A, U.S. Pat. Nos. 5,132,380, 5,189,192, 5,374,696, 5,453,410, 5,470,993, 5,494,874, and 5,532,394, incorporated herein by reference.

Substantially random interpolymers can be prepared by polymerizing an α-olefin(s) with a vinyl or vinylidene aromatic monomer(s) and/or hindered aliphatic or cycloaliphatic vinyl or vinylidene monomer(s). Substantially random interpolymers are described, for example, in U.S. Pat. No. 6,211,302 (Ho et al.) U.S. Pat. No. 6,190,768 (Turley et al.), U.S. Pat. No. 6,156,842 (Hoenig et al.), and U.S. Pat. No. 6,111,020 (Oriani et al.), the disclosures of which are incorporated by reference herein. The preparation of substantially random interpolymers includes polymerizing a mixture of polymerizable monomers in the presence of one or more metallocene or constrained geometry catalysts in combination with various cocatalysts. Operating conditions include pressures from atmospheric up to 3000 atmospheres and temperatures from −30° C. to 200° C. Examples of suitable catalysts and methods for preparing the interpolymers are described in EP 0,416,815(B1) and U.S. Pat. No. 5,703,187 (Timmers), the disclosures of which are incorporated by reference herein.

An example of olefin-based elastomers is a terpolymer made from ethylene-propylene diene monomer (EDPM). A process for preparing EPM polymers is described, for example, in U.S. Pat. No. 3,341,503 (Paige et al., Uniroyal, Inc.), the disclosures of which are incorporated by reference herein. An exemplary catalyst system for preparing EDPM comprises a vanadium compound such as vanadium oxytrichloride or tetrachloride, a co-catalyst that is typically an organoaluminum compound, and an activator such as a nitropropane and quinone.

Any catalyst conventionally employed to produced the above-mentioned polymers can be used for polymerization in the process of the invention. Such catalysts can include Phillips catalysts, Ziegler catalysts, Ziegler-Natta catalysts containing transition metals such as vanadium, chromium, titanium, and metallocenes. Examples of useful metallocene catalysts known in the art are disclosed, for example in U.S. Pat. No. 5,455,366 (Rohrmann), U.S. Pat. No. 5,329,033 (Spaleck et al.), U.S. Pat. No. 5,317,036 (Brady et al.), U.S. Pat. No. 5,145,819 (Winter et al.), and U.S. Pat. No. 5,106,806 (Job), the disclosures of which are incorporated by reference herein.

Homogeneous catalysts employed in the production of a homogeneous ethylene interpolymer include metallocene species based on monocyclopentadienyl transition metal complexes described in the art as constrained geometry metal complexes (CGC catalysts), including titanium complexes. Useful metallocene species include constrained geometry metal complexes as disclosed in U.S. Pat. Nos. 5,869,575 and 5,844,045 (Kolthammer et al.), U.S. Pat. Nos. 5,783,638, 5,665,800, 5,278,272 and 5,272,236 (Lai et al.), U.S. Pat. No. 5,703,187 (Timmers), and U.S. Pat. No. 5,677,383 (Chum et al.), all to The Dow Chemical Company, the disclosures of which are incorporated by reference herein.

Heterogeneous catalysts that can be employed include typical Ziegler-type catalysts. Heterogeneous catalysts comprise a supported transition metal compound (e.g., a titanium compound or a combination of a titanium compound and a vanadium compound) and a cocatalyst/activator. Examples of such catalysts are described in U.S. Pat. No. 5,231,151 (Spencer et al.), U.S. Pat. No. 4,612,300 (Coleman, III), U.S. Pat. No. 4,547,475 (Glass et al.), U.S. Pat. No. 4,314,912 (Lowery, Jr. et al.), and U.S. Pat. No. 4,076,698 (Anderson et al.), all to The Dow Chemical Company the disclosures of which are incorporated by reference herein.

Examples of chromium-based catalysts are described, for example, in U.S. Pat. No. 4,540,755 (Mayhew et al.), U.S. Pat. No. 4,619,980 (McDaniel), U.S. Pat. No. 4,668,838 (Briggs), U.S. Pat. No. 4,735,931 (McDaniel), U.S. Pat. No. 5,066,736 (Dumain et al.), U.S. Pat. No. 5,244,987 (Bernard et al.), U.S. Pat. No. 5,115,068 (Bailey et al.), U.S. Pat. No. 5,137,994 (Goode et al.), U.S. Pat. No. 5,473,027 (Batchelor et al.), and U.S. Pat. No. 4,804,714 (Olivo), the disclosures of which are incorporated by reference herein. Chromium-based catalysts also include other fluoride and titanium modified chromium catalysts and silyl chromates. In a chromium-based catalyst system, oxygen can be used to modify the production rate and resin properties, particularly the flow properties of the resin, typically either the melt index or flow index, at a set oxygen to α-olefin molar ratio and catalyst feed rate to achieve desired resin properties and a desired production rate.

Conventional additives that can be introduced into the resin include, for example, antioxidants, ultraviolet absorbers, antistatic agents, photosensitizers, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents.

Various articles can be prepared from the olefin polymer products prepared using the disclosed control methodologies. Such products can be used in injection molded, blow molded, roto-molded products, wire coating, piping and tubing, and films. Useful articles include films such as cast, blown and extrusion coated types of films; fibers such as staple fibers, spunbonded fibers, or melt blown fiber systems (using e.g., systems as disclosed in U.S. Pat. No. 4,340,563 (Appel et al., to Kimberly-Clark); U.S. Pat. No. 4,663,220 (Wisneski et al., to Kimberly-Clark); U.S. Pat. No. 4,668,566 (Braun, to Kimberly-Clark); or U.S. Pat. No. 4,322,027 (Reba, to Crown Zellerbach); and gel spun fiber systems (e.g., the system disclosed in U.S. Pat. No. 4,413,110 (Kavesh et al., to Allied Corporation), both woven and nonwoven fabrics such as spunlaced fabrics (as disclosed in U.S. Pat. No. 3,485,706 (Evans)), or structures made from such fibers, including, for example, blends of these fibers with other fibers, e.g., PET or cotton; and molded articles such as articles made using an injection molding process, a blow molding process, or a roto-molding process. The polymer products described herein are also useful for wire and cable coating operations, shrink film applications as well as in sheet extrusion for vacuum forming operations. Polymers made by these processes may also be useful for pipe applications, such as gas and water pipes. Fabricated articles made from ethylene polymer blends comprising at least one homogeneously branched substantially linear ethylene/α-olefin interpolymer and at least one heterogeneously branched ethylene polymer, are described by Chum et al., in U.S. Pat. No. 5,677,383. Compositions comprising olefin polymers can be formed into fabricated articles such as those mentioned using conventional polyolefin processing techniques, which are well known to the skilled in the art of polyolefin processing.

While various embodiments of the disclosed method have been described above, it should be understood that they have been presented by way of example only, and not limitation. For example, while the exemplary embodiments depict systems and methods applied in a two-reactor system, the system could be, for example, a single reactor system with two catalysts. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

What is claimed is:

1. A method of controlling a process for producing a polymer in at least one reactor, comprising:
   (a) calculating a first value of at least one property of a first polymer component using a mathematical model for the first polymer component produced by a first catalyst or under a first set of reaction conditions;
   (b) calculating a second value of the at least one property of a second polymer component using a mathematical model for the second polymer component produced by a second catalyst or under a first set of reaction conditions;
   (c) determining the relative rate of production of the first and second polymer components;
   (d) calculating a bulk average value of the at least one property using a mathematical model for the bulk averaged composition;
   (e) adjusting one or more reaction conditions thereby effecting an instantaneous value of the at least one property of at least one of the first or second polymer components or effecting the production rate of at least one of the first or second polymer components to move the bulk average value toward a desired set point value.

2. The method according to claim 1 including (f) determining an update factor from estimated or calculated process and resin conditions and an independent laboratory or instrument measurement.

3. The method according to claim 2, wherein the first value of the at least one property is an instantaneous value.

4. The method according to claim 3 further including (g) adjusting the mathematical model for the first polymer component using the update factor determined or derived from empirical data.

5. The method according to claim 2, wherein the second value of the at least one property is an instantaneous value.

6. The method according to claim 5 further including adjusting the mathematical model for the second polymer component using the update factor determined or derived from empirical data.

7. The method according to claim 2, further including adjusting the mathematical model for the production rate using the update factor determined or derived from empirical data.

8. The method according to claim 2 further including adjusting the mathematical model for the bulk averaged value of the at least one property using the update factor determined or derived from empirical data.

9. The method according to claim 1 wherein the first and second polymer components are produced by a single catalyst system in a multiple reactor system.

10. The method according to claim 1 wherein the first and second polymer components are produced by a mixed catalyst system in a single reactor.

11. The method according to claim 1 wherein the first and second polymer components are produced by catalyst system having at least two catalytically active sites in a single reactor.

12. The method according to claim 1 wherein the first component is produced by a first catalyst and the second polymer component is produced by a second catalyst.

13. The method according to claim 1 including iteratively, periodically, or intermittently repeating steps a-e.

14. The method according to claim 2 including iteratively, periodically, or intermittently repeating steps a-f.

15. The method according to claim 3 including iteratively, periodically, or intermittently repeating steps a-g.

16. A method of controlling a process for producing a polymer composition, the method comprising:
   (a) determining an existing volume of a polymer composition;
   (b) calculating a first instantaneous value of a property and production rate of a first polymer component using a mathematical model at a first time;
   (c) calculating an second instantaneous value of the property and production rate of a second polymer component using a mathematical model at a first time;
   (d) calculating a bed average value of the property of polymer composition comprising the first polymer component and the second polymer component from the first and second instantaneous values calculated in (a), (b), and the existing volume based on a set of mixing rules at the first time, $t_1$;
   (e) implementing a control action to move the value of the bed average property toward a desired value of the bed average property.

17. The method according to claim 16, wherein the control action includes affecting the instantaneous value of the property of the first polymer component.

18. The method according to claim 16, wherein the control action includes affecting the instantaneous value of the property of the second polymer component.

19. The method according to claim 16, wherein the control action includes affecting the relative production rates of at least one of the first or second polymer components.

20. The method according to claim 16, wherein calculating the bed averaged value of the property is achieved using a mixing rule according to the following formula:

$$\hat{P}_{bulk,k}^{-\frac{1}{b}} = \frac{R_{1,k}\hat{P}_{1,k}^{-\frac{1}{b}} + f_k R_{2,k}\hat{P}_{2,k}^{-\frac{1}{b}} + \frac{V_{k-1}}{\Delta t}\hat{P}_{bulk,k-1}^{cor\,-\frac{1}{b}}}{\frac{V_k}{\Delta t} + R_{total,k}}$$

where:
$\hat{P}_{1,k}$=Instantaneous Property of first value at time k
$\hat{P}_{2,k}$=Instantaneous Property of second value at time k
$\hat{P}_{bulk,k-1}^{cor}$=Corrected bulk property at time k−1
$\hat{P}_{bulk,k}$=Bulk property at time k
$R_{1,k}$=Production rate of first value at time k
$R_{2,k}$=Production rate of second value at time k
$R_{total,k}$=Total rates discharged
$f_k$=Model update factor at time k
$V_{k-1}$=Volume of total polymer at time k−1
$V_k$=Volume of total polymer at time k
$\Delta t$=Calculation interval
b=Mixing coefficient.

21. The method according to claim 16 wherein the first and second polymer components are produced by a single catalyst system in a multiple reactor system.

22. The method according to claim 16 wherein the first and second polymer components are produced by a mixed catalyst system in a single reactor.

23. The method according to claim 16 wherein the first component is produced by a first catalyst and the second polymer component is produced by a second catalyst.

24. The method according to claim 16 including iteratively, periodically, or intermittently repeating steps a-e.

\* \* \* \* \*